United States Patent
Kamo et al.

(10) Patent No.: US 8,354,180 B2
(45) Date of Patent: Jan. 15, 2013

(54) METHOD FOR SEPARATING ACTIVE MATERIAL OF ELECTRODE PLATE FOR STORAGE BATTERY

(75) Inventors: Takashi Kamo, Toyohashi (JP); Kyoichi Shukuri, Sagamihara (JP); Shunji Kuramoto, Sagamihara (JP)

(73) Assignees: Panasonic EV Energy Co., Ltd., Kosai-shi (JP); Omega Techno Modeling Co., Ltd., Sagamihara-shi (JP)

( * ) Notice: Subject to any disclaimer, the term of this patent is extended or adjusted under 35 U.S.C. 154(b) by 1098 days.

(21) Appl. No.: 12/092,966

(22) PCT Filed: Dec. 20, 2006

(86) PCT No.: PCT/JP2006/325434
§ 371 (c)(1),
(2), (4) Date: May 7, 2008

(87) PCT Pub. No.: WO2007/077745
PCT Pub. Date: Jul. 12, 2007

(65) Prior Publication Data
US 2009/0095631 A1  Apr. 16, 2009

(30) Foreign Application Priority Data
Dec. 27, 2005  (JP) ................... 2005-374391

(51) Int. Cl.
*H01M 6/50*  (2006.01)
(52) U.S. Cl. .......................... 429/49; 29/730
(58) Field of Classification Search ............. 429/49
See application file for complete search history.

(56) References Cited

U.S. PATENT DOCUMENTS

| 5,429,887 A | | 7/1995 | Lyman |
| 5,478,664 A | * | 12/1995 | Kaneko et al. .............. 429/49 |
| 6,120,927 A | * | 9/2000 | Hayashi et al. ............. 429/49 |

(Continued)

FOREIGN PATENT DOCUMENTS

JP  7-335276 A  12/1995

(Continued)

OTHER PUBLICATIONS

Notification of the First Office Action from the State Intellectual Property Office of the People's Republic of China dated Jul. 31, 2009, issued in corresponding Chinese Application no. 200680042318.X.

(Continued)

*Primary Examiner* — Ula C Ruddock
*Assistant Examiner* — Jacob Marks
(74) *Attorney, Agent, or Firm* — Christensen O'Connor Johnson Kindness PLLC

(57) ABSTRACT

An electrode plate (20) for storage batteries is immersed into an aqueous solution (18) containing phosphoric acid, an ethoxy alcohol, ammonium bifluoride, sulfonic acid and sodium xylenesulfonate, and the aqueous solution (18) is stirred by a screw stirrer (22). The aqueous solution (18) is kept at about 30° C. by a heater (14), and the active material of the electrode (20) is separated therefrom. The aqueous solution (18) contains the respective solutes in the following mass ratios: 15-20 parts by mass of the phosphoric acid; 3-7 parts by mass of the ethoxy alcohol; 2-6 parts by mass of the ammonium bifluoride; 4-8 parts by mass of the sulfonic acid; and 1-3 parts by mass of the sodium xylenesulfonate.

4 Claims, 6 Drawing Sheets

U.S. PATENT DOCUMENTS

| | | | |
|---|---|---|---|
| 6,150,050 A | 11/2000 | Mathew | |
| 6,180,278 B1 * | 1/2001 | Prickett et al. | 429/49 |
| 6,524,737 B1 | 2/2003 | Tanii | |
| 7,192,564 B2 * | 3/2007 | Cardarelli et al. | 423/62 |
| 2005/0148570 A1 * | 7/2005 | Huang et al. | 514/192 |
| 2007/0196725 A1 | 8/2007 | Tedjar | |

FOREIGN PATENT DOCUMENTS

| | | | |
|---|---|---|---|
| JP | 10-255862 | * | 3/1997 |
| JP | 10-241750 A | | 9/1998 |
| JP | 10-255862 A | | 9/1998 |
| JP | 11-97076 A | | 4/1999 |
| JP | 2005-197149 A | | 7/2005 |
| JP | 2006-4883 A | | 1/2006 |
| JP | 2006-331707 A | | 12/2006 |
| WO | 02/23651 A1 | | 3/2002 |
| WO | 2005/101564 A1 | | 10/2005 |

OTHER PUBLICATIONS

Supplementary European Search Report and Search Opinion mailed Sep. 22, 2009, issued in corresponding International Application No. EP 06 84 2955, filed Dec. 12, 2006.

Communication Pursuant to Article 94(3) EPC, mailed Jun. 6, 2011, issued in corresponding European Patent Application No. 06 842 955.4, filed Dec. 20, 2006, 5 pages.

Notice of Grounds for Rejection mailed Oct. 4, 2011, issued in corresponding Japanese Application No. 2005-37439, filed Dec. 27, 2005, and English translation provided by foreign associate, 5 pages.

* cited by examiner

METHOD FOR SEPARATING ACTIVE MATERIAL OF ELECTRODE PLATE FOR STORAGE BATTERY

TECHNICAL FIELD

The present invention relates to a storage battery used in a portable cellular phone, a hybrid vehicle, and the like, and more particularly to a method for separating a substrate and an active material from each other when an electrode plate formed by coating or filling the substrate with an active material, such as a nickel-metal hydride battery, a lithium ion battery, and the like.

RELATED ART

A storage battery has recently been used as a power source for various devices, and the type of the storage battery includes storage batteries of an alkaline secondary battery family typified by a nickel-metal hydride battery, storage batteries of an organic electrolyte secondary battery family typified by a lithium ion battery, and the like. On the grounds that these storage batteries can be expected to exhibit high reliability and can also be expected to be reduced in size and weight, a compact battery is widely used for various portable devices, and a large-sized battery is widely used for industrial use or for driving an automobile.

A nickel-metal hydride battery is a storage battery which uses, as an active material for an anode (negative), a hydrogen absorbing alloy capable of preserving hydrogen in a lattice of an alloy and which performs charge and discharge by utilization of extraction and insertion of hydrogen ions from and into the lattice. In the hydrogen absorbing alloy used as the active material for the anode, a binder which is usually a resin is kneaded with water, and a collector is coated or filled with this paste, to thus form the anode. In the meantime, a cathode (positive) is usually formed by means of using, as a collector, a three-dimensional porous element formed from metal, such as nickel, which exhibits high alkali resistance; and filling the collector with a paste formed from nickel hydroxide powder which is an active material through use of water, or the like.

A lithium ion battery is generally of a rocking chair type which uses a carbon material, such as graphite, as an anode active material; in which lithium ions are extracted from and inserted into layers of the carbon material; which uses a transition-metal oxide as a cathode active material; and in which lithium ions are passed between the cathode and the anode during a charge-discharge reaction. The anode is formed by binding the carbon material to a foil—which is used as a collector—through of a resin binder. The cathode is formed by means of: adding a conductive ancillary material of amorphous carbon to an oxide powder which is formed from transition metal and lithium ion serving as an active material; applying a mixture over a foil used as a collector by means of a resin binder; and drying the mixture, to thus bind the active material.

Many batteries have been used along with recent development and proliferation of portable devices, such as portable cellular phones and video movies, and development and proliferation of HEVs (hybrid electric vehicles) and the like, and recovery and recycling of all discarded batteries are required from the viewpoint of global environment preservation.

In the case of recycling of recovered batteries, there are methods: a method for pulverizing storage batteries into pieces and separating the pieces by material type; and the other method for mechanically disassembling a battery into components piece by piece and separating the broken-down components by constituent component. An example of the latter method is described in; for example, 10-241750 A. 10-241750 A discloses a method for separating an active material from a collector by means of thermal shock after a storage battery has been separated into electrodes.

In the meantime, 7-335276 A discloses a processing method employed after separation of a battery into electrode plates, in which a binder is dissolved by means of a solvent and in which an active material is separated from a collector by application of ultrasonic vibration.

However, the method described in 7-335276 A entails use of, at a stage of manufacture of a storage battery, a binder whose solvent used during recycling has already been designated. Designating a solvent—which will be used during recycling operation several years later or tens of years later for the case of a vehicle-mounted storage battery—is a far cry from industrial applicability, and poses extreme difficulty in operation of a recycling system.

If an attempt is made to actually put this method into service, recycling service providers must examine types of binders of respective storage batteries and perform separating operation by switching a solvent from one storage battery to another. Specifically, when a solvent appropriate solely for a specific binder is used, a solvent must be prepared at the time of recycling operation according to specifications (the type of a binder) of a battery, and enormous numbers of types of solvents must be prepared in consideration of the types of batteries (a nickel-metal hydride storage battery, a lithium ion storage battery, and the like), specifications of the batteries (types of binders used in the batteries; polyvinyl alcohol, carboxymethylcellulose, and the like), and others.

DISCLOSURE OF THE INVENTION

The present invention provides a method for separating an active material of an electrode plate for a storage battery which enables easy separation of a substrate (a collector) from an active material layer in an electrode plate of a battery.

The present invention is characterized in that, in a process of separating an active material from substrates of electrode plates for a storage battery in which the electrode plates formed by coating or filling the substrates with the active material are positioned opposite each other with a separator interposed therebetween, the electrode plates for a storage battery are immersed in an aqueous solution containing a phosphoric acid as a solute.

In one embodiment of the present invention, in addition to a phosphoric acid, there are included an ethoxy alcohol, ammonium bifluoride, a sulfonic acid, and sodium xylenesulfonate. Preferable percentage contents of these solutes expressed in mass ratios are 15 to 20 parts by mass of the phosphoric acid; 3 to 7 parts by mass of the ethoxy alcohol; 2 to 6 parts by mass of the ammonium bifluoride; 4 to 8 parts by mass of the sulfonic acid; and 1 to 3 parts by mass of the sodium xylenesulfonate.

Although not the entire action of an aqueous solution containing a phosphoric acid has been elucidated, exfoliation of an active material layer from an interface between a substrate and the active material layer resulting from penetration of the aqueous solution containing a phosphoric acid into an electrode plate has been observed, and separation of the substrate from the active material is considered to be performed at dramatically-high efficiency by virtue of this phenomenon.

According to the present invention, use of an aqueous solution containing a phosphoric acid enables easy exfoliation of an active layer from a substrate serving as an electrode plate. Further, since there is no particular necessity for selecting a binder, an active material, and the like, considerably-high industrial availability is attained.

BRIEF DESCRIPTIONS OF DRAWINGS

BEST MODES FOR PRACTICING THE INVENTION

Embodiments of the present invention will be described hereunder by reference to the drawings. In the embodiments, an active material of an electrode plate for a storage battery, such as a nickel-metal hydride battery and a lithium ion battery, is separated from a substrate by means of immersing the substrate into an aqueous solution containing a phosphoric acid; more specifically, an aqueous solution containing as solutes a phosphoric acid, an ethoxy alcohol, ammonium bifluoride, a sulfonic acid, and sodium xylenesulfonate. The aqueous solution is maintained at a predetermined temperature by means of a heater, or the like, and the electrode plates for a storage battery are immersed in the aqueous solution. Mass ratios of the solutes in the aqueous solution are 15 to 20 parts by mass of the phosphoric acid; 3 to 7 parts by mass of the ethoxy alcohol; 2 to 6 parts by mass of the ammonium bifluoride; 4 to 8 parts by mass of the sulfonic acid; and 1 to 3 parts by mass of the sodium xylenesulfonate. The aqueous solution is stirred by means of an agitator, to thus create streams in the aqueous solution. Thereby, the active materials can be separated from the electrode plates in a short period of time. More specific explanations are provided by reference to the embodiments.

First Embodiment

An embodiment using an anode of a nickel-metal hydride battery. The anode employed in the present embodiment was manufactured by means of mixing Mm (misch metal), La, Ni, Co, Al, and Mn; melting them in an RF melting furnace, to thus form an ingot of an LaNi-based alloy, specifically, a hydrogen absorbing alloy having a composition of $MmAl_{0.3}Mn_{0.4}Co_{0.75}Ni_{3.55}$; and subjecting the ingot to heat treatment at 1060° C. for ten hours. After the ingot had been pulverized into coarse particles, the particles were further pulverized in the presence of water by use of a wet ball mill, and resultant particles were sifted through a sieve having a sieve having a mesh size of 75 µm, whereby an alloy powder formed from a hydrogen absorbing alloy having an average particle size of 20 µm was obtained.

Next, 5 parts by mass of a mixture consisting of carboxymethylcellulose (CMC) and styrene-butadiene rubber (SBR) were mixed to 100 parts by mass of the thus-obtained alloy powder, to thus produce a hydrogen absorbing alloy paste. This hydrogen absorbing alloy paste was applied over both surfaces of a substrate formed from punching metal; the substrate was dried in a drying oven at 120° C.; the thus-dried substrate was rolled with a pressure of 200 kgf/cm$^2$; and slicing the substrate into a dimension of an electrode plate, to thus create a hydrogen absorbing alloy anode. This anode plate was used for a test for separation of an active material from a substrate in an electrode for a storage battery.

Figure 1:
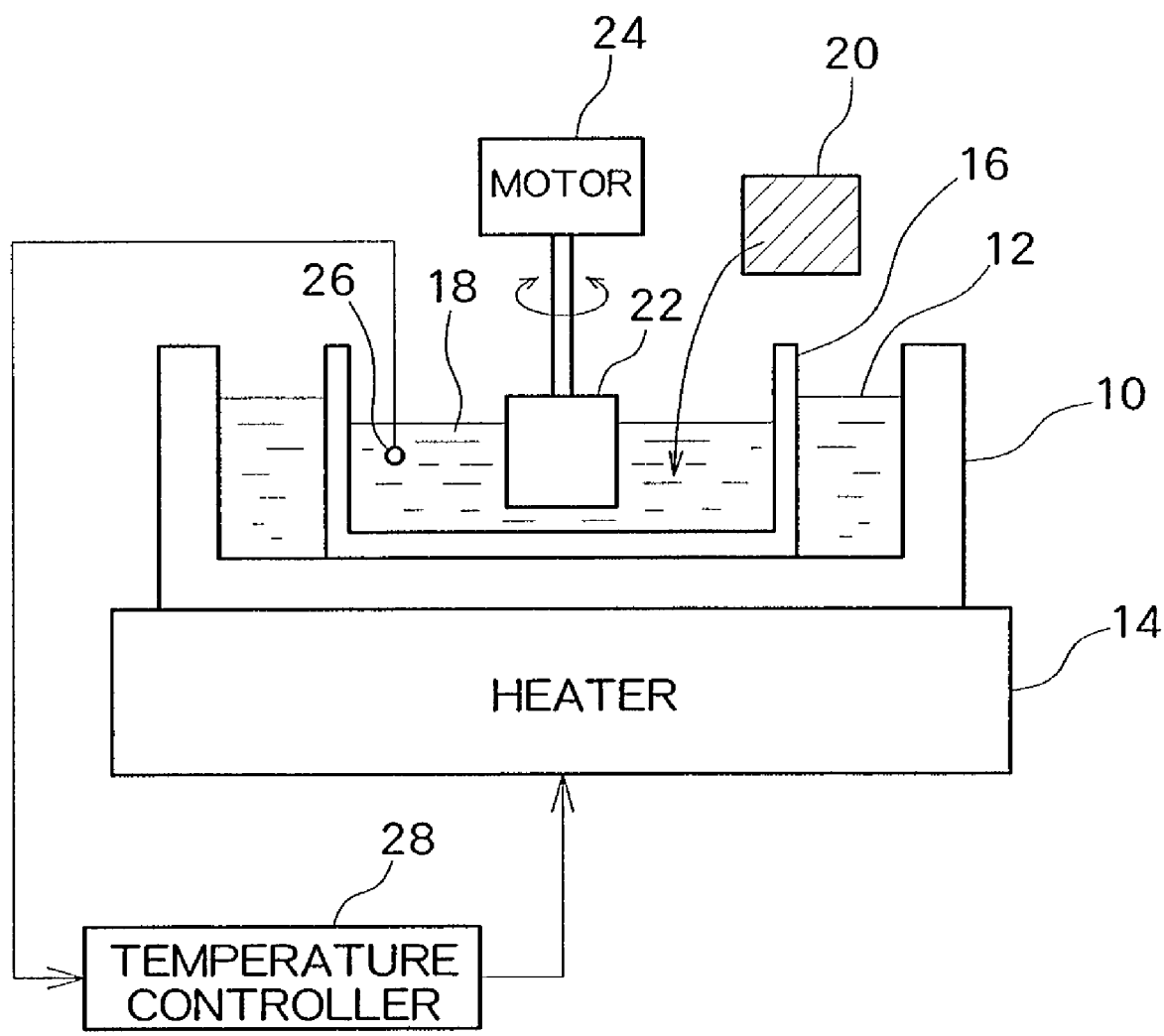
FIG. 1 is a block diagram of a test apparatus of an embodiment.

FIG. 1 shows the configuration of an immersion apparatus used for the separation test. Hot water 12 was poured into a water bath 10 formed from stainless steel, and the temperature of hot water was adjusted by means of a heater 14. An agitation bath 16 made of polypropylene was put into the hot water 12; the aqueous solution 18 was poured into the agitation bath 16; and the electrode plate 20 was immersed into the aqueous solution 18. The aqueous solution 18 was agitated by means of an agitator built from a screw 22 and a motor 24. The screw 22 is; for example, a two-bladed screw and was rotationally driven by the motor 24 at 560 rpm, to thus agitate the aqueous solution 18. The temperature of the aqueous solution 18 was detected by means of a temperature sensor 26; the temperature of the aqueous solution 18 detected by means of the temperature sensor 26 was supplied to a temperature controller 28; and the heater 14 was controlled in such a way that a desired temperature was obtained.

The aqueous solution 18 employed herein contains the solutes of the present invention; specifically, an aqueous solution containing 5 mass percents of a stock solution; an aqueous solution containing 10 mass percents of the stock solution; an aqueous solution containing 15 mass percents of the stock solution; an aqueous solution containing 20 mass percents of the stock solution; an aqueous solution containing 30 mass percents of the stock solution; an aqueous solution containing 40 mass percents of the stock solution; an aqueous solution containing 50 mass percents of the stock solution; an aqueous solution containing 75 mass percents of the stock solution; and an aqueous solution containing 100 mass percents of the stock solution, wherein the stock solution contains 16 mass percents of a phosphoric acid, 7 mass percents of an ethoxy alcohol, 6 mass percents of ammonium bifluoride, 8 mass percents of a sulfonic acid, 3 mass percents of sodium xylenesulfonate, and a remainder of water. The temperatures of the aqueous solutions 18 were set to 30° C., 40° C., and 50° C., respectively. Changes in the status of the electrode plates 20 immersed in the respective aqueous solutions 18 were observed. A time which elapses since the initiation of a change in the alloy film until achievement of perfect separation of the alloy was measured. A test time per plate was taken as a maximum of 90 minutes. When perfect separation was not achieved within 90 minutes, a residual factor was computed. The residual factor is expressed as a residual factor (mass percents)=(a weight acquired after a test−0.86 g)/(a weight acquired before the test−0.86 g)×100, where a number of 0.86 g signifies an average weight of a substrate. A total quantity of the aqueous solution 18 was 1200 milliliters, and a new aqueous solution was used for each of conditions. Each aqueous solution was used to the number of tests=3. An alloy left in the aqueous solution was filtrated at completion of the test of n=1 and removed.

Figure 2:
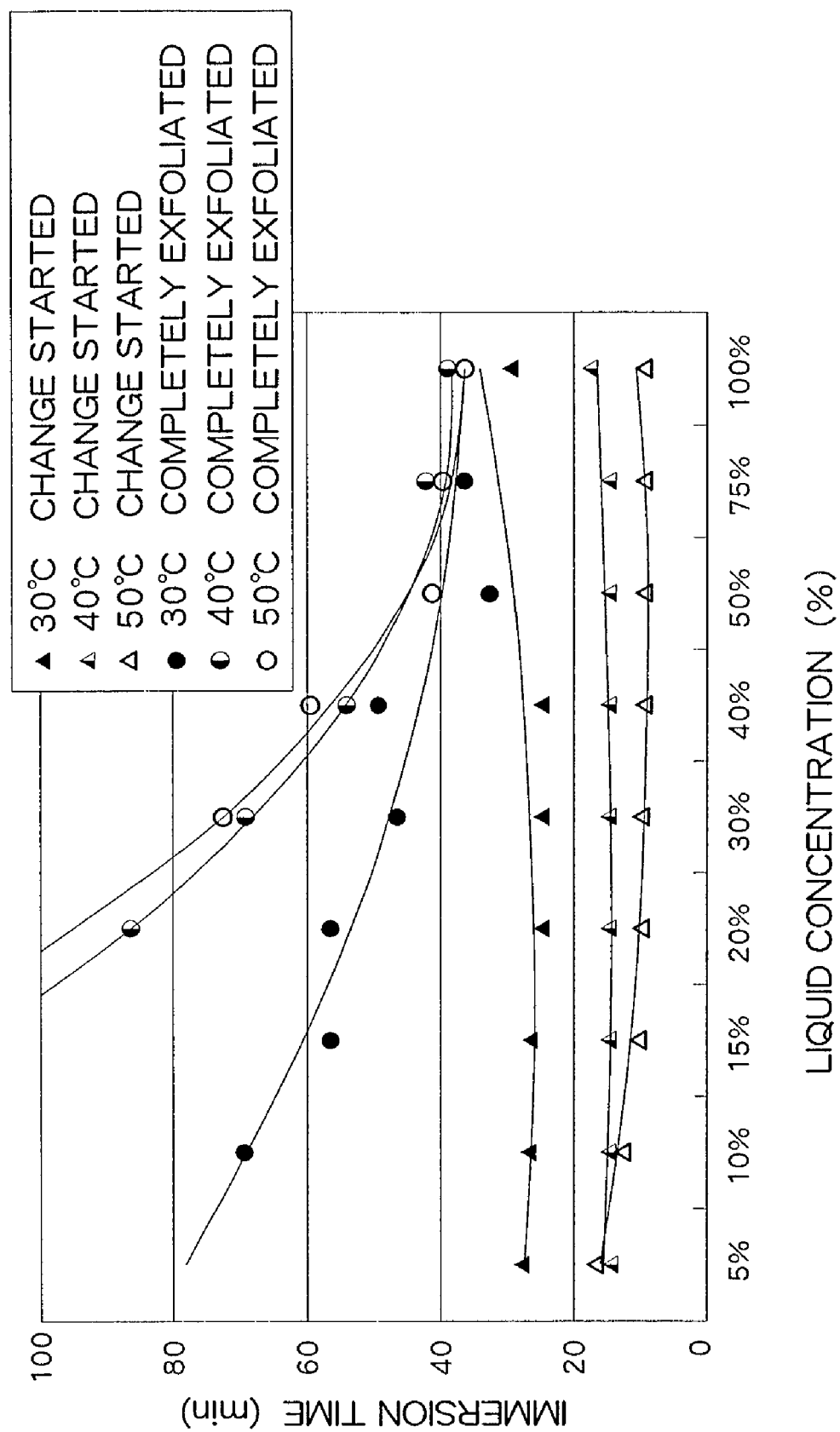
FIG. 2 is a graph showing (brushless) test results of the embodiment.

FIG. 2 shows test results. In the drawing, a horizontal axis represents mass percents [hereinafter designated as a "solution concentration (%)"], and a vertical axis represents an immersion time (min.). Triangular symbols in the graph show times when changes arose in the alloy films in the aqueous solutions 18 at respective temperatures of 30° C., 40° C., and 50° C., and circular symbols show times when perfect exfoliation of the respective alloy films were achieved at respective temperatures of 30° C., 40° C., and 50° C. For example, in the case of a 5% aqueous solution, a change started at 30° C. after elapse of 28 minutes, but perfect exfoliation of the alloy film was not achieved even after elapse of 90 minutes. A change initiated at 40° C. after elapse of 15 minutes, but perfect exfoliation of the alloy film was not achieved even after elapse of 90 minutes. A change initiated at 50° C. after elapse of 17 minutes, but perfect exfoliation of the alloy film was not achieved even after elapse of 90 minutes. In the case of a 30% aqueous solution, a change started at 30° C. after elapse of 25 minutes, and perfect exfoliation of the alloy film was achieved after elapse of 47 minutes. A change initiated at 40° C. after elapse of 15 minutes, and perfect exfoliation of the alloy film was achieved after elapse of 70 minutes. A change initiated at 50° C. after elapse of 10 minutes, and perfect exfoliation of the alloy film was achieved after elapse of 73 minutes. In the case of a 100% aqueous solution, a change started at 30° C. after elapse of 30 minutes, and perfect exfoliation of the alloy film was achieved after elapse of 39 minutes. A change initiated at 40° C. after elapse of 18 minutes, and perfect exfoliation of the alloy film was achieved after elapse of 38 minutes. A change initiated at 50° C. after elapse of 10 minutes, and perfect exfoliation of the alloy film was achieved after elapse of 37 minutes.

From FIG. 2, it is seen that, as the temperature becomes higher, the faster changes appear in the surface; and that there are not any significant differences attributable to concentrations. Any essential difference attributable to temperatures do not arise between a concentration of 75% and a concentration of 100% in terms of the time elapsed until achievement of perfect exfoliation of the alloy film; and a much longer time is consumed in lower concentrations under conditions of 40° C. and 50° C., thereby increasing differences in time. Great differences arose especially under conditions of 30° C., 40° C., and 50° C. Perfect exfoliation of the alloy was impracticable within 90 minutes under conditions of: at 50° C. in a concentration of 30%; at 40° C. in a concentration of 30%; and at 30° C. in a concentration of 10%. The time elapsed at 30° C. since initiation of a surface change until achievement of perfect exfoliation of the alloy film is short, whereas the times elapsed at 40° C. and 50° C. since initiation of a surface change until achievement of perfect exfoliation of a film are long. Emission of foam from the surface of the alloy film immersed at temperatures of 40° C. and 50° C. was observed.

Residual factors (mass percents) achieved when perfect exfoliation of the alloy film was not achieved within 90 minutes are as follows:
5%-30° C.: 58.1
5%-40° C.: 75.0
5%-50° C.: 73.1
10%-40° C.: 63.6
10%-50° C.: 40.0
15%-40° C.: 29.8
15%-50° C.: 32.2
20%-50° C.: 8.5

In relation to the status of the alloy achieved after exfoliation, it was observed that the alloy was exfoliated in the form of a film at a temperature of 30° C. or less and that the alloy was exfoliated in the form of a powder at a temperature of 40° C. or more.

As above, it was ascertained that the conditions of 30° C. or thereabouts are, on balance, effective for exfoliation within a short period of time and that a concentration of 30% or higher is effective.

Second Embodiment

In the first embodiment, after the electrode plate had been immersed in the aqueous solution for five minutes, the respective surfaces of the electrode plate were further subjected to brushing for two minutes. These operations are taken as one cycle, and the operations were repeated until the alloy film was completely exfoliated. The weight of the alloy achieved after removal of water content was measured at the end of each cycle. Brushing was practiced while load was being imposed on the brush by means of a weight of 575 g.

Figure 3:
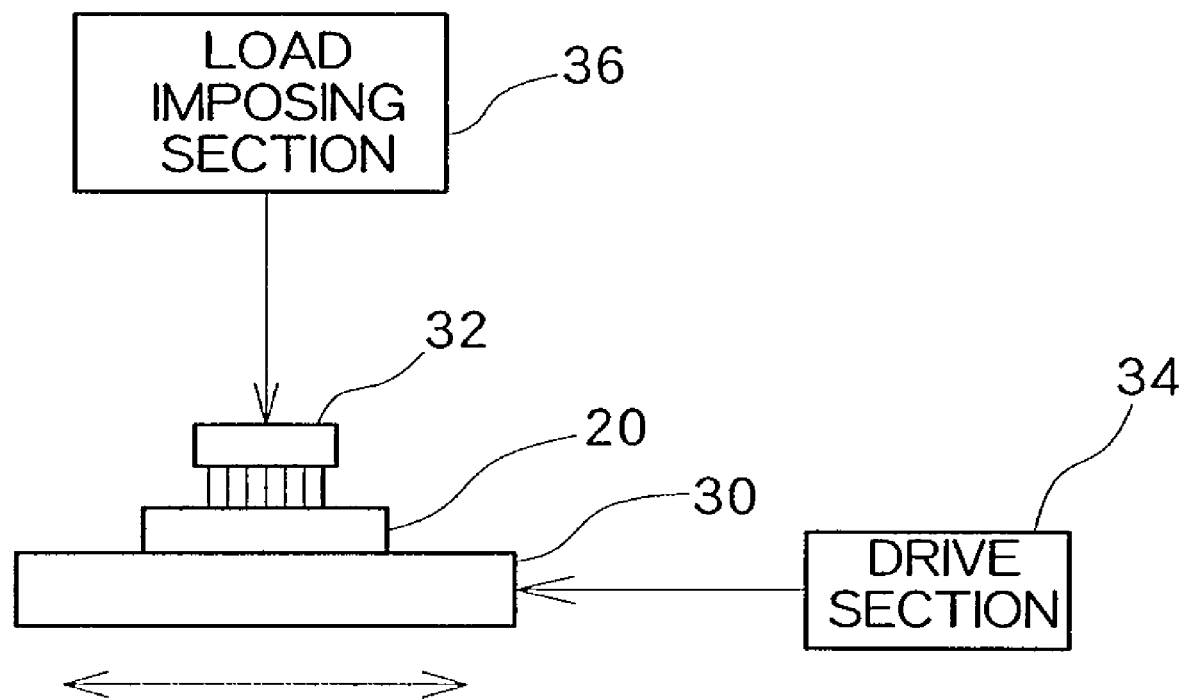
FIG. 3 is a schematic diagram of a brushing apparatus of the embodiment.

FIG. 3 shows the configuration of a brushing apparatus. The electrode plate 20 was fixed onto a stage 30, and the stage 30 was horizontally reciprocated by means of a drive section 34. Brushing was performed by means of bringing the brush 32 into contact with the electrode plate 20 and applying predetermined load (575 g) from a weight application section 36. The brush 32 is a cleansing brush made of vinyl, and the stage 30 was reciprocally actuated (60 to-and-fro movements/min.) over a distance of 100 mm. It was previously ascertained that no change in the alloy film was induced by means of mere brushing action without involvement of immersion of the electrode plate in the aqueous solution. Moreover, an attempt was also made to exfoliate the alloy film through use of ultrasonic waves, but an effect of accelerated exfoliation attributable to ultrasonic waves was not yielded.

Figure 4:
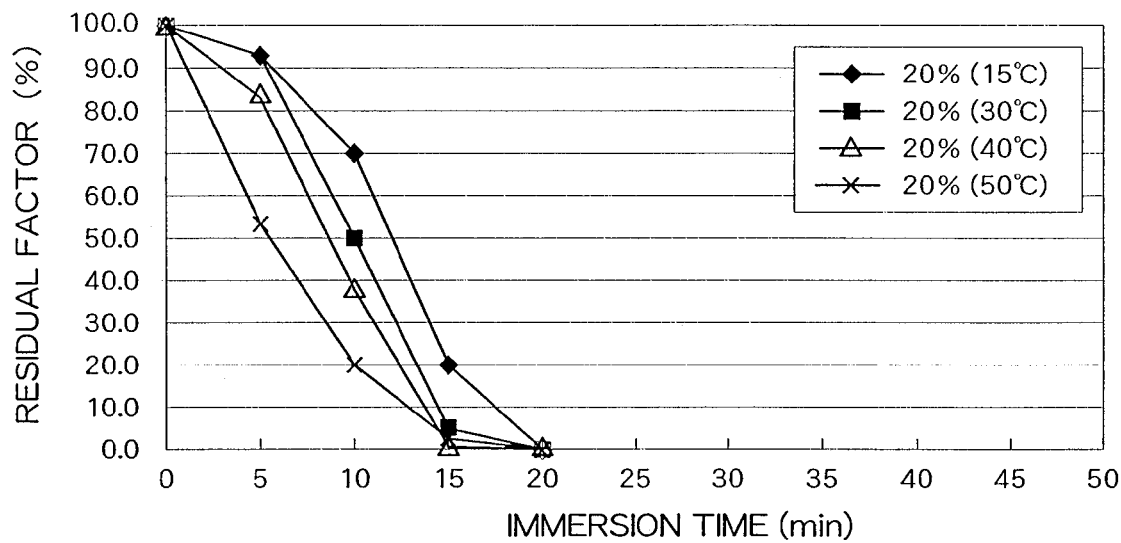
FIG. 4 is a graph showing test results (acquired with a brush: in a concentration of 20%) of the embodiment.
Figure 5:
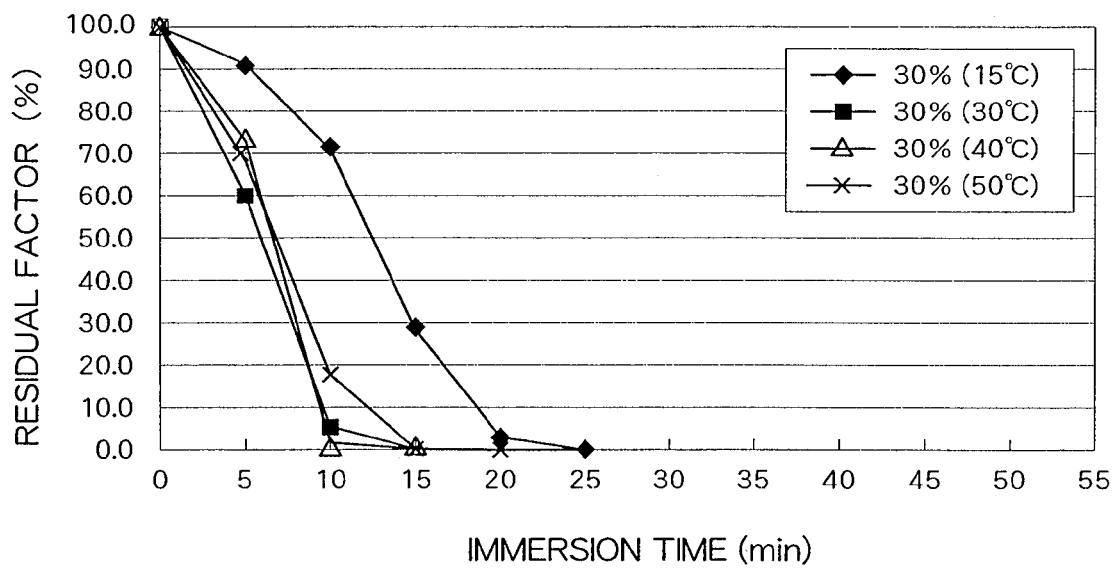
FIG. 5 is a graph showing test results (acquired with a brush: in a concentration of 30%) of the embodiment.
Figure 6:
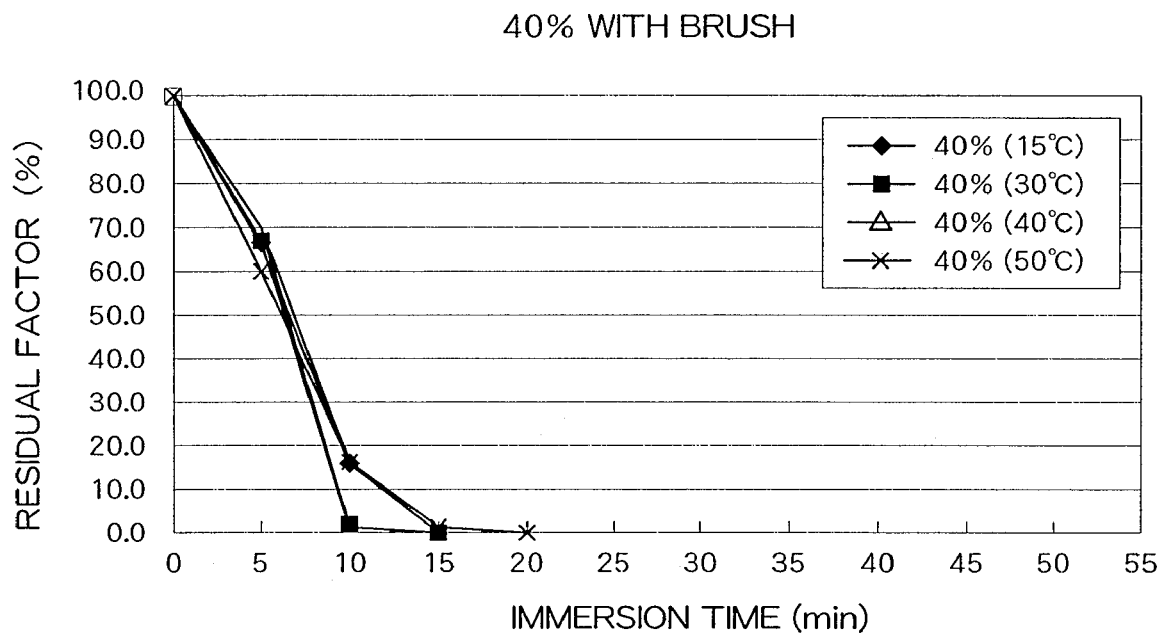
FIG. 6 is a graph showing test results (acquired with a brush: in a concentration of 40%) of the embodiment.
Figure 7:
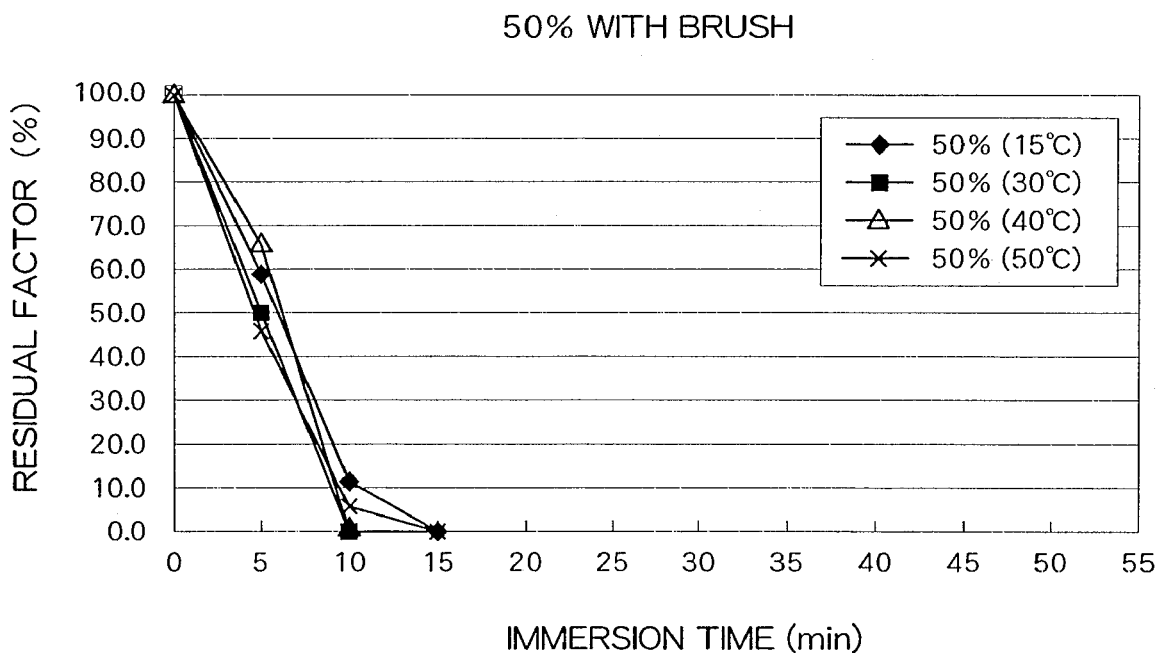
FIG. 7 is a graph showing test results (acquired with a brush: in a concentration of 50%) of the embodiment.
Figure 8:
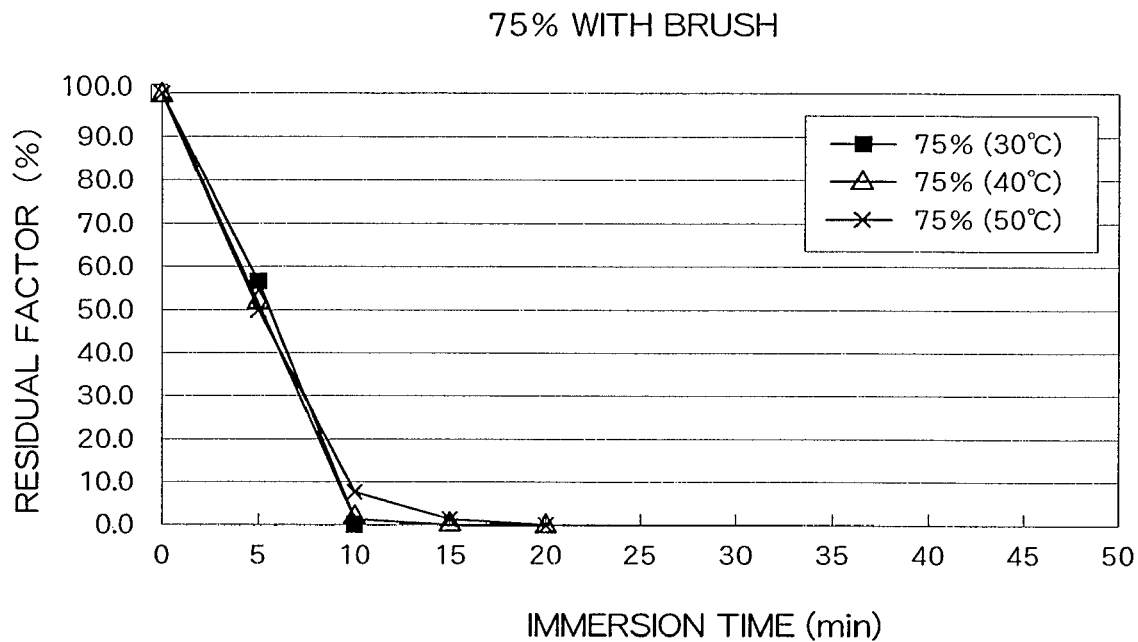
FIG. 8 is a graph showing test results (acquired with a brush: in a concentration of 75%) of the embodiment.
Figure 9:
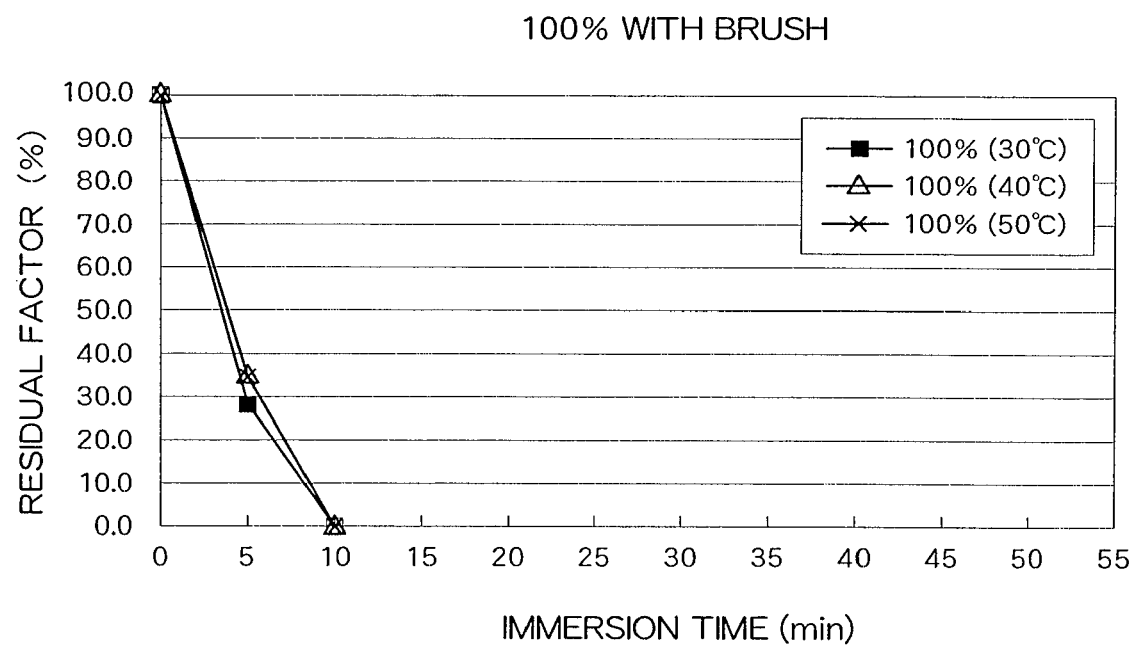
FIG. 9 is a graph showing test results (acquired with a brush: in a concentration of 100%) of the embodiment.

FIGS. 4 through 9 show test results. In the drawings, a horizontal axis represents an immersion time (min.) (which can also be said to represent the number of cycles because immersion is performed for five minutes in one cycle), and a vertical axis represents a residual factor (mass percents). FIG. 4 shows a case of a solution concentration of 20%; FIG. 5 shows a case of a solution concentration of 30%; FIG. 6 shows a case of a solution concentration of 40%; FIG. 7 shows a case of a solution concentration of 50%; FIG. 8 shows a case of a solution concentration of 75%; and FIG. 9 shows a case of a solution concentration of 100%. In FIG. 5, a residual factor came to zero at 15° C. in 25 minutes; and a residual factor came to zero at 30° C., 40° C., and 50° C. in 15 minutes. In FIG. 9, a residual factor came to zero at 30° C., 40° C., and 50° C. in 10 minutes.

From these drawings, it is seen that any substantial differences attributable to temperatures are not found in results achieved in a concentration of 40% to a concentration of 100%. Further, any significant differences do not exist in the times that elapsed until achievement of perfect exfoliation, in a concentration of 15% to a concentration of 30%. Further, a difference arose in the times elapsed until achievement of perfect exfoliation, in a concentration of 5% and a concentration of 10%. The status of the alloy achieved after exfoliation is analogous to that achieved in the case of no brushing shown in connection with the first embodiment, and it was observed that the alloy was exfoliated in the form of a powder at 40° C. and 50° C. and that the alloy was exfoliated in the form of a film at 30° C.

As above, it was ascertained that the time elapsed until achievement of perfect exfoliation could be shortened by use of brushing in combination. It was also affirmed that exfoliation became stable as natural exfoliation at a temperature of 30° C. or thereabouts and that a concentration of about 30% was sufficient because no significant differences were found in the exfoliation capabilities achieved in a concentration of 30% or higher.

Third Embodiment

An embodiment using an electrode plate of a lithium ion battery is shown. For the cathode, a cathode active material (a lithium cobaltate ($LiCoO_2$)), a conductive material (carbon black (CB)), and a binder (polyvinylidene difluoride (PVDF)) were mixed with water, to thus prepare a cathode active material paste. This paste contains these substances at a mass ratio of $LiCoO_2$:CB:PVDF=about 85:10:5. The thus-obtained cathode active material paste was applied over both surfaces of an aluminum foil (a cathode collector) having a thickness of about 15 μm, and the aluminum foil was pressed in such a way that the thickness of the entire foil assumed a value of about 37 μm. Thus, a cathode sheet was created.

For the anode, an anode active material (carbon black (CB)) and a binder (polyvinylidene difluoride (PVDF)) were mixed with water, to thus prepare an anode active material paste. This paste contains these substances at a mass ratio of CB:PVDF=about 90:10. The thus-obtained paste was applied over both surfaces of a copper foil (an anode collector) having a thickness of about 15 μm, and the copper foil was pressed in such a way that the thickness of the entire foil assumes a value of about 37 μm. Thus, an anode sheet was created.

The anode sheet and the cathode sheet were immersed in and exposed to, for third minutes, an aqueous solution with a concentration of 0%, an aqueous solution with a concentration of 5%, an aqueous solution with a concentration of 10%, an aqueous solution with a concentration of 20%, and an aqueous solution with a concentration of 50%, wherein the aqueous solutions each had the same percentages of the solutes as those described in connection with the first embodiment, and results shown in Table 1 were obtained. In Table 1, a denominator represents the number of samples used in the tests, and a numerator represents the number of exfoliated samples. In the case of a lithium ion storage battery, since a substrate is a metal foil, an active material is likely to remove in the form of a layer. In the samples where exfoliation arose, the active materials were not essentially left on the substrate.

TABLE 1

| | | SOLUTION CONCENTRATION | | | | |
|---|---|---|---|---|---|---|
| | | 0% (WATER) | 5% | 10% | 20% | 50% |
| TEMPERATURE OF SOLUTION | 30° C. | 0/50 | 45/50 | 49/50 | 50/50 | 50/50 |
| | 40° C. | 0/50 | 46/50 | 50/50 | 50/50 | 50/50 |
| | 50° C. | 0/50 | 48/50 | 50/50 | 50/50 | 50/50 |

Comparative Example 1

An exfoliation test was carried out by use of water (purified water) in order to ascertain an effect of the aqueous solution 18 used in the above embodiments. The progress of exfoliation was observed while the electrode plate was immersed in water for 90 minutes. The temperature of the aqueous solution was set to 15° C., 10° C., and 0° C., respectively. A result of the test shows that any substantial changes did not arise in weight before and after immersion and that exfoliation did not arise essentially.

Comparative Example 2

The electrode plate was immersed in water for five minutes, and both surfaces of the electrode plate were subjected to brushing for two minutes. Brushing was practiced under a weight of 575 g while load was being imposed on the electrode plate. These operations were taken as one cycle and repeatedly performed. Water content was removed from the electrode plate after completion of one cycle, and the weight of the resultant plate was measured. The temperature of water was set to 15° C. and 100° C., respectively. Results of three tests are expressed as residual factors (mass percents).

15° C.: 97.1, 96.7, 98.1
100° C.: 99.3, 99.7, 99.0

As mentioned above, it was confirmed that any substantial changes did not arise in any tests and that exfoliation did not arise. Slight reductions in weight were caused by chipping of edges of the plate.

From the above comparative examples, it was affirmed that extreme difficulty was encountered in exfoliation of an alloy film in water (purified water) and that, even when the plate was subjected to brushing while load was being imposed on the plate, difficulty was encountered likewise.

The invention claimed is:

1. A method for exfoliating an active material layer of an electrode plate for a storage battery, in a process of exfoliating the active material layer from a substrate of an electrode plate for a storage battery in which the electrode plates formed by coating or filling the substrates with the active material layer are positioned opposite each other with a separator interposed therebetween, the method comprising:
   in a process of exfoliating the active material layer from an interface between the substrate of an electrode plate for a storage battery and the active material layer, immersing the electrode plates for a storage battery in an aqueous solution containing a phosphoric acid, an ethoxy alcohol, ammonium bifluoride, a sulfonic acid, and sodium xylenesulfonate as solutes, and wherein percentage contents of the solutes in the aqueous solution are 15 to 20 parts by mass of the phosphoric acid; 3 to 7 parts by mass of the ethoxy alcohol; 2 to 6 parts by mass of the ammonium bifluoride; 4 to 8 parts by mass of the sulfonic acid; and 1 to 3 parts by mass of the sodium xylenesulfonate, wherein the active material layer is exfoliated in the form of a layer comprising at least one active material and a binder; and
   removing the active material layer from the solution to recover the active material.

2. The method for exfoliating an active material layer of an electrode plate for a storage battery according to claim 1, wherein, in the process of exfoliating the active material layer from the substrate, the electrode plate for a storage battery is immersed in the aqueous solution while the aqueous solution is being stirred to thus maintain constantly a state of the aqueous solution on an exfoliated surface.

3. The method for exfoliating an active material layer of an electrode plate for a storage battery according to claim 1, wherein, after the electrode plate has been immersed in the aqueous solution, the surface of the electrode plate is subjected to brushing under predetermined load.

4. The method for exfoliating an active material layer of an electrode plate for a storage battery according to claim 1, wherein a temperature of the aqueous solution is about 30° C. to 50° C.

* * * * *